United States Patent [19]
Wisdom

[11] 3,944,804
[45] Mar. 16, 1976

[54] INTERIOR LIGHTS FOR MOTOR VEHICLES

[75] Inventor: Ronald David Wisdom, Coventry, England

[73] Assignee: Chrysler United Kingdom Limited, London, England

[22] Filed: Sept. 20, 1974

[21] Appl. No.: 507,953

[30] Foreign Application Priority Data
Nov. 1, 1973 United Kingdom............... 50903/73

[52] U.S. Cl............................. 240/7.25; 240/52 BL
[51] Int. Cl.$^2$...................... B60Q 1/24; B60Q 1/26
[58] Field of Search............... 240/7.25, 7.35, 7.1 R, 240/52 BL

[56] References Cited
UNITED STATES PATENTS
2,075,199  3/1937  Horner........................... 240/52 BL FOREIGN PATENTS OR APPLICATIONS
1,472,533  3/1969  Germany........................... 240/7.25

*Primary Examiner*—Richard A. Wintercorn
*Attorney, Agent, or Firm*—Edward F. Connors

[57] ABSTRACT

The disclosure relates to an interior light for a motor vehicle comprising a lamp body having light bulbs mounted thereon and enclosed by an elongate transparent cover. An opaque cover is slidable within the fixed cover to cover over said light bulbs or expose the bulbs and the slidable cover has at least one aperture therein through which a beam of light may pass when the cover is located over the light source.

5 Claims, 2 Drawing Figures

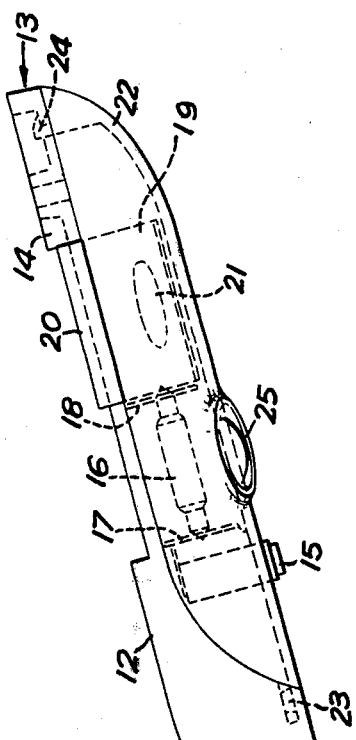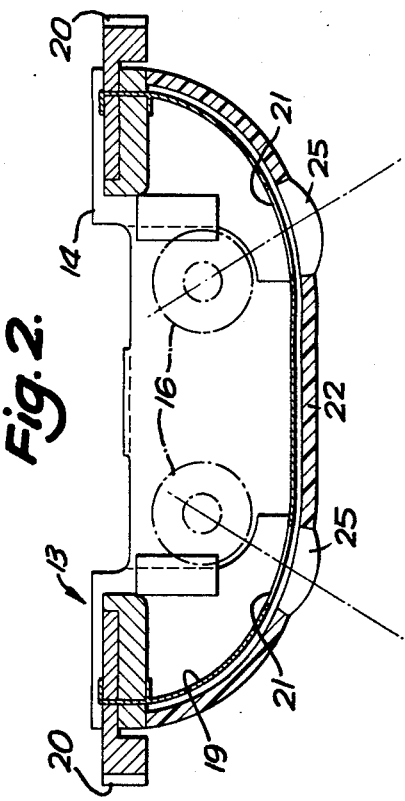

INTERIOR LIGHTS FOR MOTOR VEHICLES

BACKGROUND OF THE INVENTION

1. Field of the Invention

This invention relates to interior lights for motor vehicles.

2. Description of the Prior Art

Conventional interior lights for motor vehicles are either of the type comprising a lamp body mounted on the roof or a roof pillar and having a bulb enclosed by a diffuser to provide a general illumination or of the type usually mounted on a flexible stalk and providing a beam of light for detail work such as map reading. The latter form of light is usually only available as an extra at additional cost both for the light itself and the circuitry required for the light. Co-pending U.S. Pat. application Ser. No. 446,917 provides one solution to this problem and the object of the present invention is to provide an alternative solution.

SUMMARY OF THE INVENTION

The invention provides an interior light for a motor vehicle comprising a lamp body having a light source, a fixed elongate cover mounted on the lamp body at least a part of the cover which encloses the light source being transparent and a sliding opaque cover located within the fixed cover and slidable along the fixed cover to expose or cover the light source, said cover having at least one aperture therein to permit a beam of light to pass through the cover when the aperture is in register with the light source.

BRIEF DESCRIPTION OF THE DRAWINGS

FIG. 1 is a side view of a vehicle interior light and combined interior mirror; and FIG. 2 is a cross-sectional view through the interior light of FIG. 1.

DESCRIPTION OF THE PREFERRED EMBODIMENT

A vehicle interior mirror 10 is mounted on a stem 11. The stem widens to form a base 12 which extends rearwardly providing an integral elongate lamp body 13, the upper part of which comprises a relatively shallow base 14 having upstanding bosses with bores through which the lamp body, and hence the stem and mirror, is secured to the underside of the vehicle roof by screws.

The forward part of the lamp body adjacent the stem supports an on/off switch 15 and two elongate light bulbs 16 are located in side by side relationship on the base just rearwardly of the switch and are supported at their ends between two parallel transversely extending spaced apart thin walls 17 and 18 comprising electrically conductive elements secured to the underside of the lamp body. The elements form part of an electrical circuit to the bulbs, the circuit being opened or closed by the on/off switch or by further switches operated by opening or closing the vehicle door in a manner known per se.

An opaque cover 19 is slidable along the lamp body to cover or expose the bulbs. The cover is of substantially U-section the ends of the limbs thereof passing through respectively two narrow elongate parallel slots each adjacent a side of the lamp body. The free ends of the limbs are attached to slide members 20 which project outwardly of the lamp body. The cover is slidable between a rearward position, where the front edge of the cover is just rearward of the bulb supporting wall 18, which also acts as a light shield in a rearward direction, and a forward position where the cover masks the light bulbs and one aperture 21 or two apertures (as shown in FIG. 2) in the cover register with one of the bulbs to permit the passage of light through the or each aperture.

The on/off switch, light bulbs, and sliding cover are enclosed by an elongate moulded plastics external cover 22 of substantially open U-section, the front and rear ends of which have fingers 23 and 24 respectively which snap-fit into corresponding slots in the lamp body to secure the cover to the underside of the lamp body. The base of the switch protrudes through an aperture in the cover 22 provided for that purpose. The walls of the cover 22 are transparent for at least a length corresponding to the distance between the bulb support walls and is in register therewith when the cover is attached to the lamp body. This transparent area includes two locally thickened areas 25 in register with the light bulbs to provide lenses for directing a beam of light in a required direction. The lenses may be moulded integrally with the cover 22 or may be moulded separately and secured to the cover.

From the forgoing it will be appreciated that when the sliding cover within the external cover is in the rearward position there is a general illumination together with a beam of light through each lens of greater intensity than the surrounding area. When the sliding cover is moved to the forward position the light source between the bulb support walls is masked by the sliding cover 19 such that the light passes through one or more apertures 21 in the cover and through the lens or lenses in the fixed cover 22 which direct a beam or beams of light in the desired direction. The desired direction may be downwardly and outwardly towards either the drive or the passenger, or both, to permit for example the reading of maps.

I claim:

1. An interior light for a motor vehicle comprising a lamp body having a light source, a cover fixedly mounted on the lamp body so as to enclose the light source, at least part of the cover being transparent, at least one lens positioned in said transparent part to provide a focused beam of light, and a sliding opaque cover located within the fixed cover and slidable along the fixed cover between a first position in which the light source is covered and a second position in which the light source is exposed, said sliding cover having at least one aperture therein which registers with the lens in the transparent part of the fixed cover in the first position of the sliding cover to permit a focused beam of light provided by the lens to pass through the sliding cover while obscuring the remainder of the transparent fixed cover and the sliding cover in the second position providing general illumination.

2. An interior light as claimed in claim 1, wherein the slidable cover has two spaced apertures therein facing in divergent directions to form beams of light extending in divergent directions.

3. An interior light as claimed in claim 1 wherein said lamp body and the fixed cover are elongate and said sliding cover slidably moves lengthwise thereof with guide means provided between said lamp body and the sliding cover.

4. An interior light as claimed in claim 1 wherein the moveable cover is of generally U-shaped cross-section and slide members which project externally of the fixed cover are connected to the ends of limbs of the movable cover through slots in the lamp body which extend lengthwise of the body, for sliding of the movable cover with respect to the fixed cover.

5. An interior light as claimed in claim 3 wherein slide members project outwardly of the lamp body in connection to said sliding cover whereby the same may be moved along the body within the fixed cover.

* * * * *